United States Patent [19]
Yakou et al.

[11] Patent Number: 5,894,904
[45] Date of Patent: Apr. 20, 1999

[54] DRIVING FORCE CONTROL METHOD IN 4-WHEEL DRIVE VEHICLE

[75] Inventors: Takayuki Yakou; Koji Kuroda; Tetsuro Hamada; Kazunori Kobayashi; Masayuki Hikita, all of Wako, Japan

[73] Assignee: Honda Giken Kogyo Kabushiki Kaisha, Tokyo, Japan

[21] Appl. No.: 08/785,245

[22] Filed: Jan. 17, 1997

[30] Foreign Application Priority Data

Jan. 17, 1996 [JP] Japan .................................. 8-005673

[51] Int. Cl.$^6$ .................................................. B60K 17/20
[52] U.S. Cl. ............................ 180/247; 180/197; 701/89
[58] Field of Search .................................. 180/197, 233, 180/245, 246, 247, 248, 249; 701/82, 89, 69

[56] References Cited

U.S. PATENT DOCUMENTS

| | | | |
|---|---|---|---|
| 4,921,065 | 5/1990 | Hamada et al. | 180/245 |
| 4,966,250 | 10/1990 | Imaseki | 180/233 |
| 5,341,893 | 8/1994 | Fukui et al. | 180/245 |
| 5,396,421 | 3/1995 | Niikura et al. | 180/233 |
| 5,701,247 | 12/1997 | Sasaki | 701/89 |

Primary Examiner—Kevin Hurley
Attorney, Agent, or Firm—Armstrong, Westerman, Hattori, McLeland & Naughton

[57] ABSTRACT

A 4-wheel drive vehicle has a driving force control method in which a portion of a driving force for front wheels is distributed to rear wheels through clutches. In a 4-wheel drive state in which a driving force $T_p$ is distributed to rear wheels, for example, if the vehicle is turned leftwards to generate a difference $W_R-W_L$ between left and right rear wheel speeds, it is ensured that a driving force $T_R$ distributed to the right rear wheel, which is an outer wheel during turning of the vehicle, is larger than a driving force $T_L$ distributed to the left rear wheel, which is an inner wheel during turning of the vehicle, thereby providing an enhancement in turning performance. As the difference $W_R-W_L$ between the left and right rear wheel speeds is increased as a result of decreasing of the turning radius of the vehicle, the driving force $T_P(=T_L+T_R)$ distributed to the rear wheels is decreased to avoid an increase in travel resistance. Thus, it is possible to prevent the occurrence of problems such as a deterioration of specific fuel consumption, an abnormal sound generated in a drive system and an increase in the load of the drive system due to an increase in travel resistance during turning of the vehicle.

6 Claims, 8 Drawing Sheets

5,894,904

1

DRIVING FORCE CONTROL METHOD IN 4-WHEEL DRIVE VEHICLE

BACKGROUND OF THE INVENTION

1. Field of the Invention

The present invention relates to a driving force control method in a 4-wheel drive vehicle in which the driving force of an engine is transmitted directly to one of the front and rear wheels (that is, the main driving wheels) and through driving force varying means to the other of the front and rear wheels (that is, the auxiliary driving wheels).

2. Description of the Related Art

A driving force control method in a 4-wheel drive vehicle, in which a portion of a driving force for front wheels driven by an engine is distributed to left and right rear wheels at a predetermined ratio, is conventionally known and has already been proposed in Japanese Patent Application No. 7-295762 by the present applicant.

In the above known driving force control method, if the front wheel speed is higher than the rear wheel speed as a result of slipping of the front wheel at the starting of the vehicle or during sudden acceleration of the vehicle, a portion of the driving force for the front wheel is distributed to the left and right rear wheels to bring the vehicle into its 4-wheel drive state. If a speed difference is generated between left and right rear wheel speeds by turning of the vehicle, it is ensured that the amount of driving force distributed to outer wheels during turning of the vehicle is larger than the amount of driving force distributed to inner wheels during turning of the vehicle, thereby providing an enhancement in turning performance.

If a larger amount of driving force is distributed to the rear wheels when such vehicle is being turned in its 4-wheel drive state, the travel resistance is increased and hence, there is a possibility that problems occur such as a deterioration of specific fuel consumption, an abnormal sound generated in the drive system, an increase in load of the drive system and the like.

SUMMARY OF THE INVENTION

Accordingly, it is an object of the present invention to avoid the increase in travel resistance generated during turning of the vehicle in the 4-wheel drive state.

To achieve the above object, according to a first aspect and feature of the present invention, there is provided a driving force control method in a 4-wheel drive vehicle in which the driving force of an engine is transmitted directly to either the front or rear wheels (that is, the main driving wheels) and the driving force of the engine is also transmitted through driving force varying means to the other of the front and rear wheels (that is, the auxiliary driving wheels), the method comprising the steps of detecting a turning state of the vehicle, and decreasing the driving force to be transmitted to the other wheels (the auxiliary driving wheels), when the turning state is detected. For example, in one situation, the torque may be transmitted directly to the front wheels (main driving wheels) and through a driving force varying means to the rear wheels (auxiliary driving wheels). Of course, it would also be possible for the rear wheels to be the main driving wheels and the front wheels to be the auxiliary driving wheels.

With such arrangement, it is possible to suppress the increase in travel resistance generated by the increase in driving force during turning of the vehicle, thereby eliminating the deterioration of specific fuel consumption, the abnormal sound generated in the drive system and an increase in the load of the drive system.

According to a second aspect and feature of the present invention, in addition to the first feature, the turning state of the vehicle is detected based on a difference between left and right wheel speeds.

With the above second feature of the present invention, it is possible to easily and reliably detect the turning state of the vehicle based on the difference between the left and right wheel speeds.

According to a third aspect and feature of the present invention, there is provided a driving force control method in a 4-wheel drive vehicle in which the driving force of an engine is transmitted directly to one of front and rear wheels (that is, the main driving wheels) and through driving force varying means to the other of the front and rear wheels (that is, the auxiliary driving wheels), the method comprising the steps of detecting a difference between left and right wheel speeds of the other wheels (auxiliary driving wheels); distributing a driving force to the auxiliary driving wheel having a higher wheel speed in an amount larger than the driving force distributed to the auxiliary driving wheel having a lower wheel speed; and decreasing the driving force transmitted to the auxiliary driving wheels in accordance with an increase in a wheel speed difference between the left and right wheel speeds in a smaller range of wheel speed difference, while increasing the driving force distributed to the auxiliary driving wheels in accordance with an increase in the wheel speed difference in a larger range of the wheel speed difference.

With the third feature of the present invention, the turning performance of the vehicle can be enhanced by distributing the driving force to the auxiliary driving wheel having the higher wheel speed in the amount larger than that distributed to the auxiliary driving wheel having the lower wheel speed. When the difference has been detected between the left and right wheel speeds of the auxiliary driving wheels to which the driving force of the engine is transmitted through the driving force varying means. Moreover, the increase in travel resistance generated due to an increase in driving force during turning of the vehicle can be suppressed in order to eliminate the deterioration of specific fuel consumption, the abnormal sound generated in the drive system and an increase in the load of the drive system by decreasing the driving force transmitted through the driving force varying means in accordance with the increase in difference between the wheel speeds in the smaller range of wheel speed difference. An unnecessary driving force decreasing control conducted during slipping of one of the left and right wheels can be avoided to insure the stability of the vehicle by increasing the driving force in the larger range of wheel speed difference.

The above and other objects, features and advantages of the invention will become apparent from the following description of the preferred embodiments taken in conjunction with the accompanying drawings.

DETAILED DESCRIPTION OF THE PREFERRED EMBODIMENTS

The present invention will now be described by way of preferred embodiments with reference to the accompanying drawings.

Figure 1:
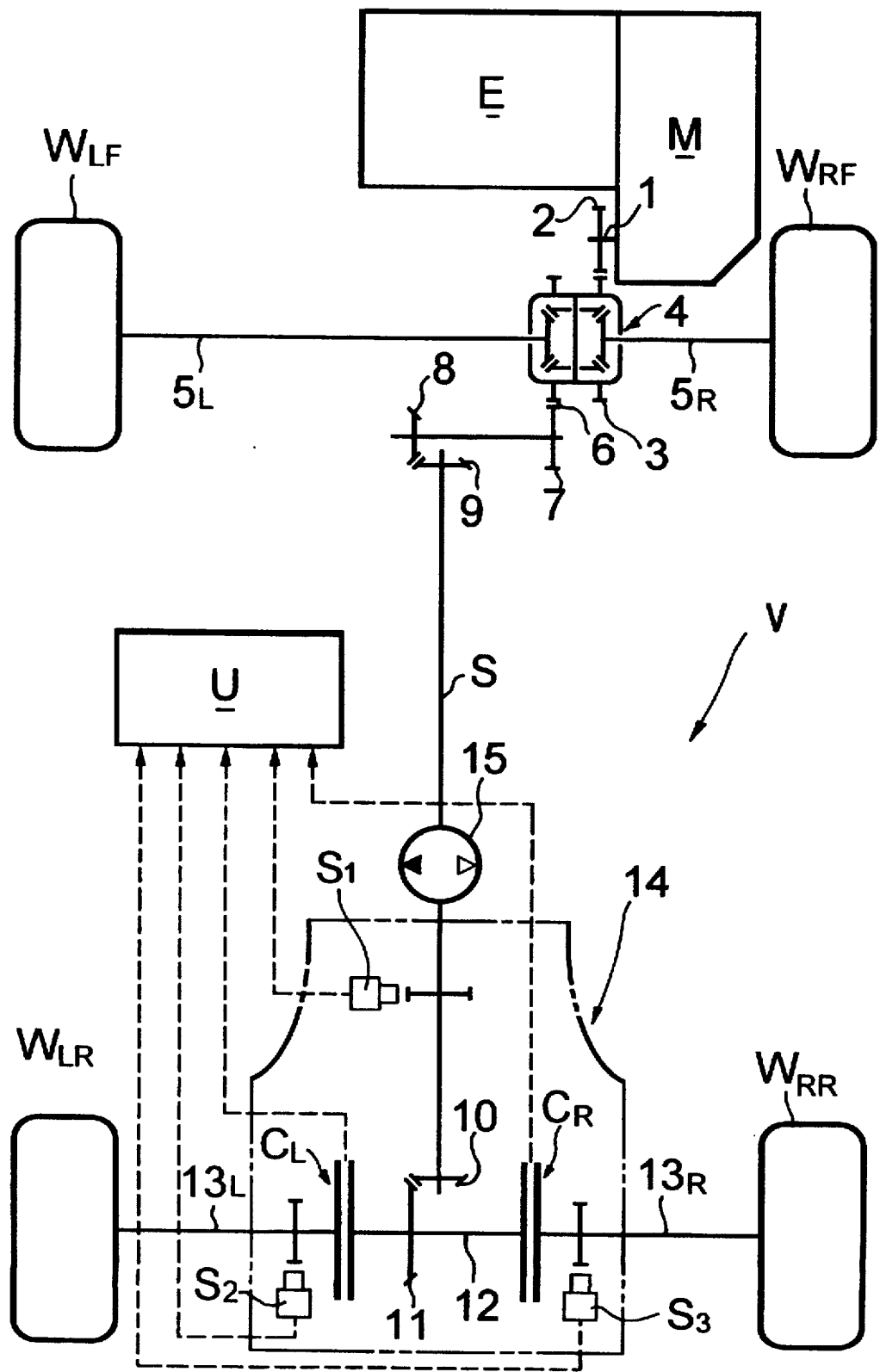
FIG. 1 is a schematic diagram of a power transmitting system of a 4-wheel drive vehicle.

Referring to FIG. 1, a 4-wheel drive vehicle V includes an engine E horizontally disposed at a front portion of a vehicle body, and a transmission M coupled to a right side of the engine E. A power transmitting system for transmitting a driving force of the transmission M to left and right front wheels $W_{LF}$ and $W_{RF}$ (the main driving wheels) is comprised of a first spur gear 2 mounted on an output shaft 1 of the transmission M, a second spur gear 3 meshed with the first spur gear 2, a front differential 4 of a bevel gear type driven by the second spur gear 3, and left and right axles $5_L$ and $5_R$ extending from the front differential 4 and connected to the front wheels $W_{LF}$ and $W_{RF}$. A power transmitting system for transmitting a driving force of the above-described power transmitting system to rear wheels $W_{LR}$ and $W_{RR}$ (the auxiliary driving wheels) includes a third spur gear 6 mounted on a differential case of the front differential 4, a fourth spur gear 7 meshed with the third spur gear 6, a first bevel gear 8 rotated in unison with a fourth spur gear 7, a second bevel gear 9 meshed with the first bevel gear 8, and a propeller shaft S extending rearwards of the vehicle body and having the second bevel gear 9 at its front end. Furthermore, the power transmitting system includes a third bevel gear 10 mounted at a rear end of the propeller shaft S, a fourth bevel gear 11 meshed with the third bevel gear 10, and axles $13_L$ and $13_R$ for the left and right rear wheels $W_{LR}$ and $W_{RR}$ connected to the fourth bevel gear 11 through a left hydraulic clutch $C_L$ and a right hydraulic clutch $C_R$. The third bevel gear 10, the forth bevel gear 11 and the left and right hydraulic clutches $C_L$ and $C_R$ constitute a rear differential 14. A hydraulic pump 15 is incorporated at an intermediate portion of the propeller shaft S, so that the left and right hydraulic clutches $C_L$ and $C_R$ are brought into their engaged states by a working oil discharged from the hydraulic pump 15.

The rear differential 14 is provided with a first speed sensor $S_1$ for detecting a number of revolutions of the propeller shaft S, a second speed sensor $S_1$ for detecting a number of revolutions of the axle $13_L$ of the left rear wheel $W_{LR}$, and a third speed sensor $S_3$ for detecting a number of revolutions of the axle $13_R$ of the right rear wheel $W_{RR}$.

Figure 2:
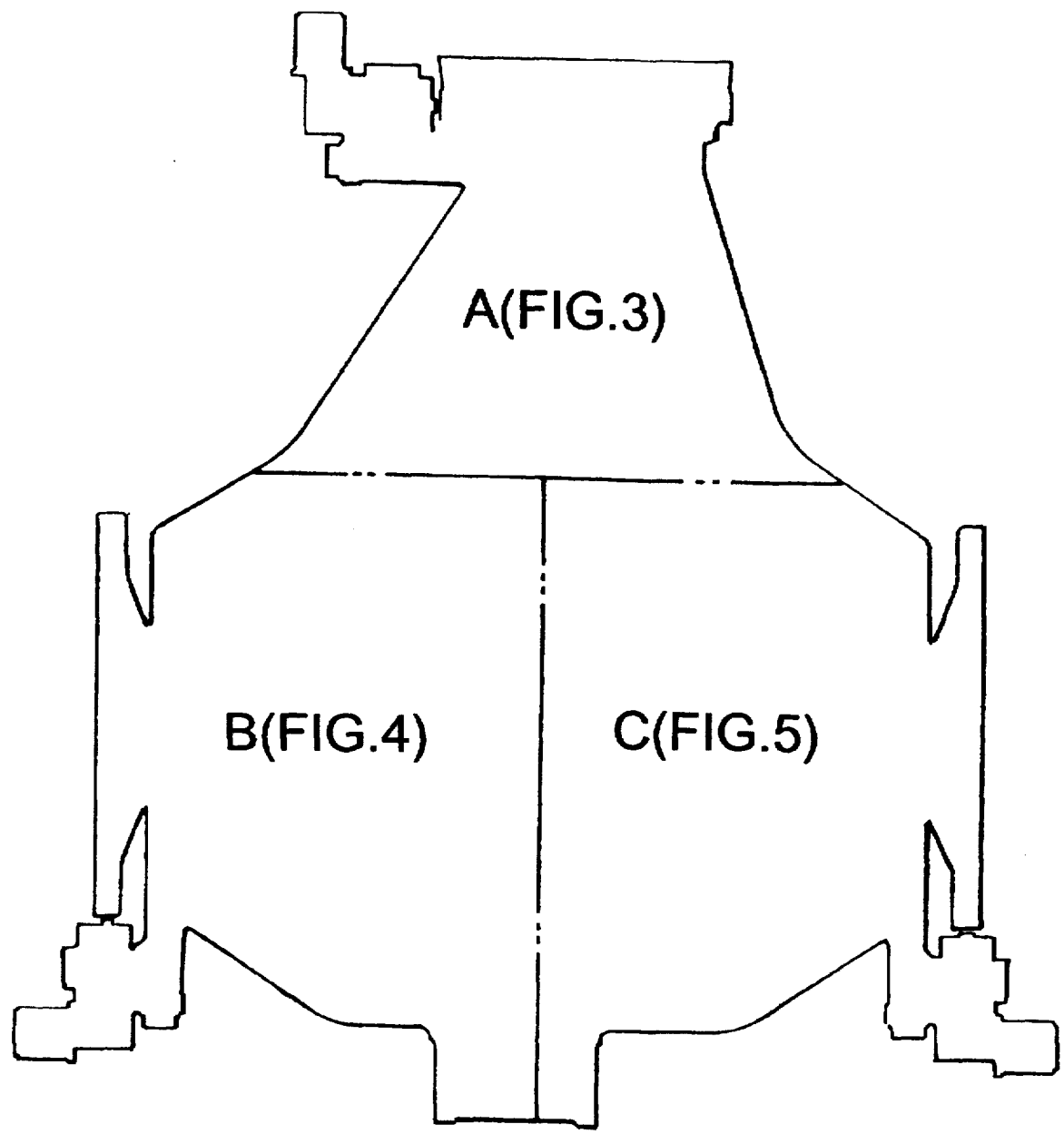
FIG. 2 is an illustration of the entire rear differential.
Figure 3:
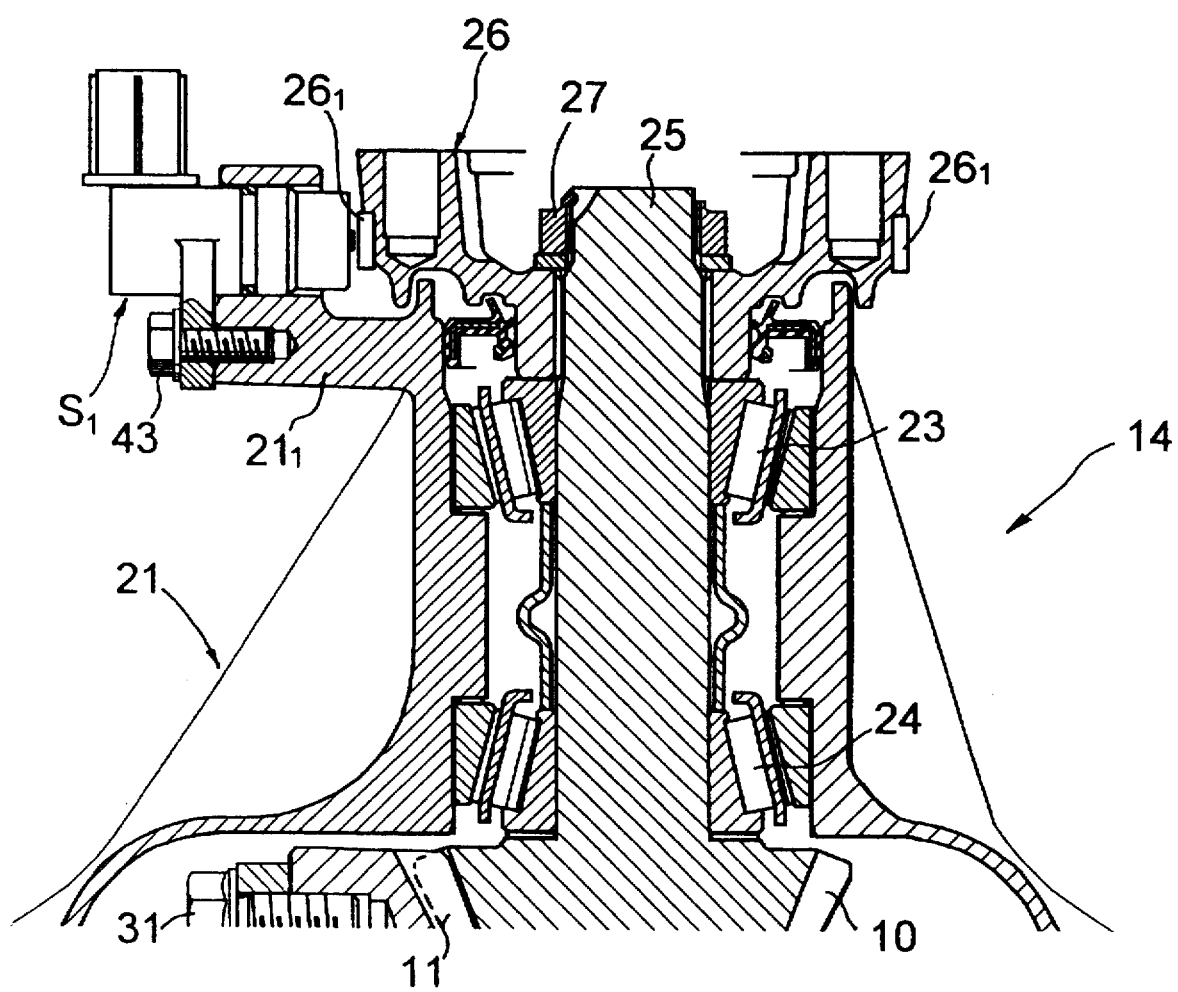
FIG. 3 is an enlarged view of a portion A shown in FIG. 2.
Figure 4:
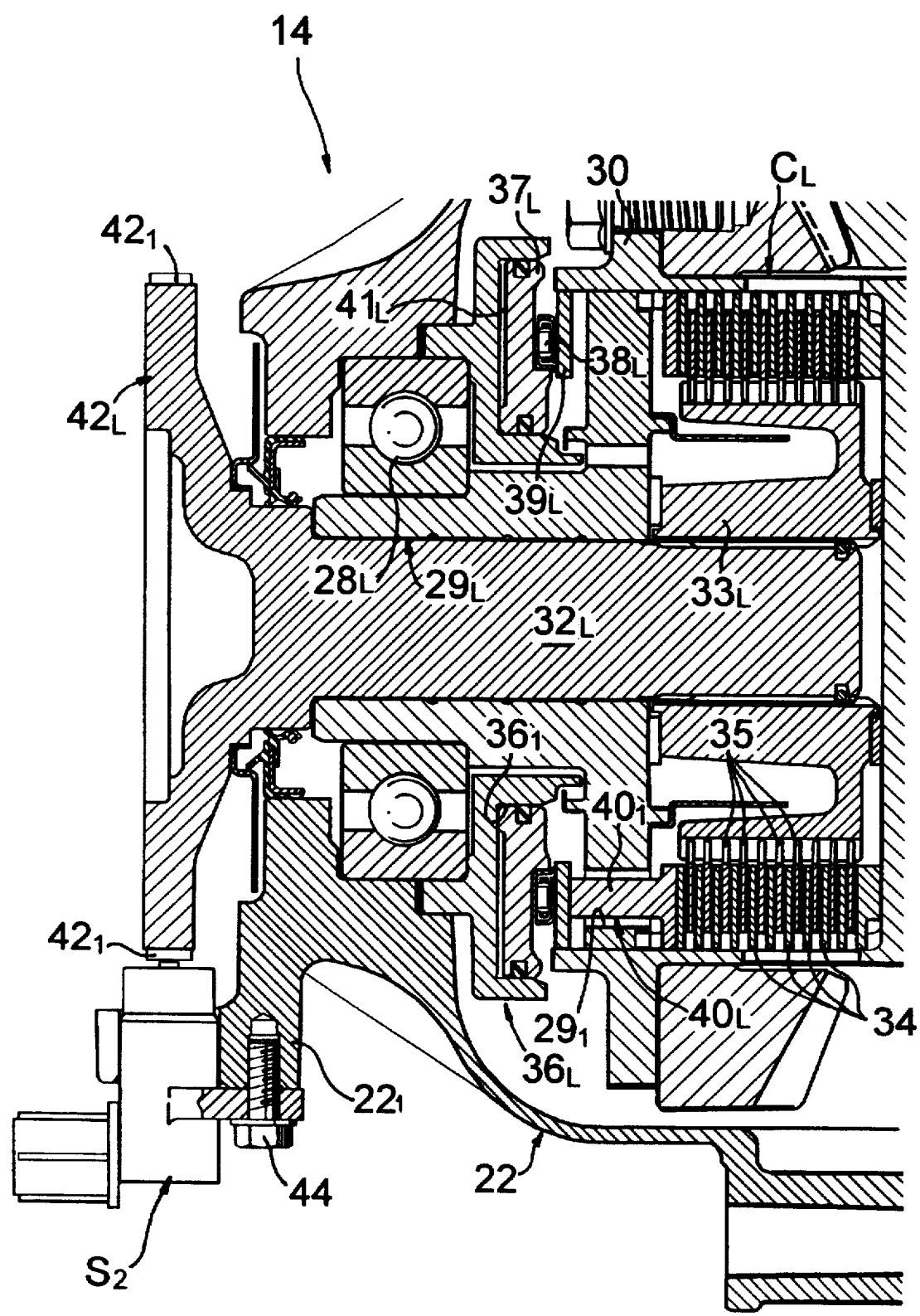
FIG. 4 is an enlarged view of a portion B shown in FIG. 2.
Figure 5:
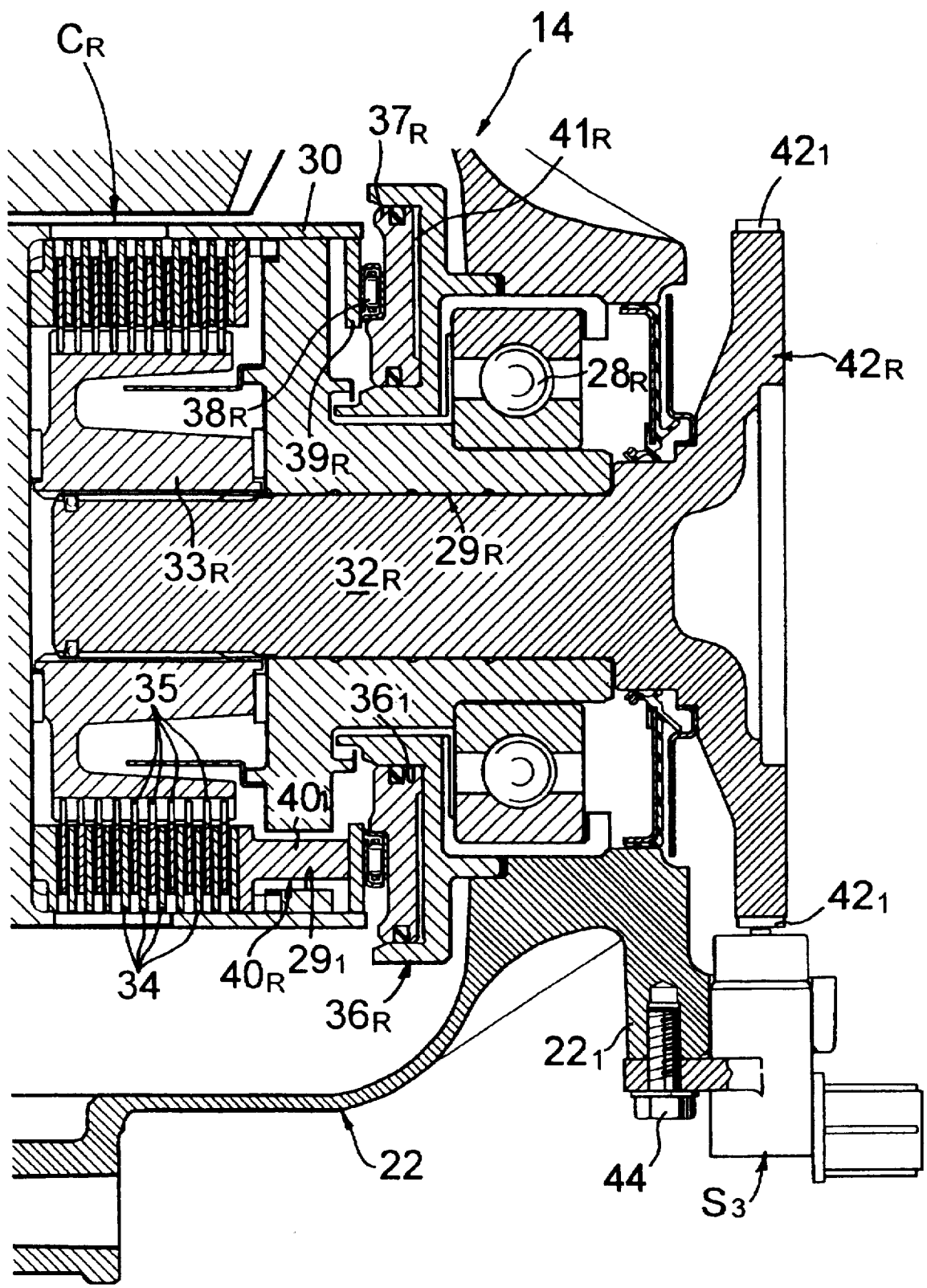
FIG. 5 is an enlarged view of a portion C shown in FIG. 2.

The structure of the rear differential 14 will be described below with reference to FIGS. 2 and 5.

The rear differential 14 includes a front casing 21 and a rear casing 22 which are defined in a longitudinally bisected manner. An input shaft 25 is supported in the front casing 21 with a pair of roller bearings 23 and 24 interposed therebetween. A flange 26 coupled to a rear end of the propeller shaft S is spline-coupled to a front end of the input shaft 25 and fixed by a nut 27. The bevel gear 10 is integrally formed at a rear end of the input shaft 25.

A pair of left and right clutch hubs $29_L$ and $29_R$ are rotatably carried in the front and rear casings 21 and 22 with ball bearing $28_L$ and $28_R$. A clutch outer 30 common to the left and right hydraulic clutches $C_L$ and $C_R$ is coupled to outer peripheries of the clutch hubs $29_L$ and $29_R$. The fourth bevel gear 11 is fixed to a left end of the clutch outer 30 by bolts 31. Thus, the rotation of the input shaft 25 is transmitted through the third bevel gear 10 and the fourth bevel gear 11 to the clutch outer 30 to rotate the clutch outer 30 along with the clutch hubs $29_L$ and $29_R$.

A left output shaft $32_L$ is rotatably carried on an inner periphery of the left clutch hub $29_L$, and a right output shaft $32_R$ is rotatably carried on an inner periphery of the right clutch hub $29_R$. Clutch inners $33_L$ and $33_R$ are spline-coupled to opposed ends of the output shafts $32_L$ and $32_R$, respectively. A plurality of clutch plates 34, spline-fitted to an inner periphery of the clutch outer 30, and a plurality of clutch disks 35, spline-coupled to outer peripheries of the clutch inners $33_L$ and $33_R$, are alternately disposed so that they can be brought into close contact with one another.

Annular pistons $37_L$ and $37_R$ are slidably received in cylinders $36_1$, $36_1$, which are formed in cylinder members $36_L$ and $36_R$ mounted in the front and rear casings 21 and 22, respectively. Thrust bearings $38_L$, $38_R$, pressure plates $39_L$ and $39_R$ and urging members $40_L$ and $40_R$ are disposed between the left and right pistons $37_L$ and $37_R$ and clutch plates 34, 34 located at the ends to transmit an urging force of the left and right pistons $37_L$ and $37_R$ to such clutch plates 34, 34. Each of the urging members $40_L$ and $40_R$ includes a plurality of legs 40, abutting against the pressure plate $39_L$, $39_R$. These legs 40, are loosely fitted in openings 291 defined in the clutch hubs $29_L$ and $29_R$.

Thus, if a hydraulic pressure is supplied into oil chambers $41_L$ and $41_R$ defined between the cylinders $36_1$, $36_1$ and the pistons $37_L$, $37_R$, the urging force of the pistons $37_L$, $37_R$ is transmitted through the thrust bearings $38_L$, $38_R$, the pressure plates $39_L$, $39_R$ and the urging members $40_L$, $40_R$ to bring the clutch plates 34 and the clutch disks 35 into close contact with one another. This causes the rotation of the clutch outer 30 to be independently transmitted through the clutch inners $33_L$, $33_R$ to the left and right output shafts $32_L$, $32_R$. The axles $13_L$, $13_R$ of the left and right rear wheels $W_{LR}$ and $W_{RR}$ are coupled to the flanges $42_L$, $42_R$ integrally formed on the left and right output shafts $32_L$, $32_R$.

The first speed sensor $S_1$ is mounted to a mounting portion $21_1$ provided on the front casing 21 of the rear differential 14 by a bolt 43. The first speed sensor $S_1$ is opposed to dogs $26_1$ projectingly provided on the flange 26 of the input shaft 25 to detect a number of revolutions of the propeller shaft S connected to the input shaft 25, i.e., an average value of left and right front wheels speeds.

The second and third speed sensors $S_2$ and $S_3$ are mounted to mounting portions $22_1$, $22_1$ provided on the rear casing 22 of the rear differential 14 by bolts 44, 44. The second and third speed sensors $S_2$ and $S_3$ are opposed to dogs $42_1$ projectingly provided on the flanges $42_L$ and $42_R$ of the left and right outputs $32_L$ and $32_R$ to detect numbers of revolutions of the axles $13_L$ and $13_R$ of the left and right rear wheels $W_{LR}$ and $W_{RR}$, i.e., left and right rear wheels speeds, respectively.

Returning to FIG. 1, signals from the first, second and third speed sensors $S_1$, $S_2$ and $S_3$ are input to an electronic control unit U which controls the engaged states of the left and right hydraulic clutches $C_L$ and $C_R$ based on the signals. Wire harnesses (not shown) connected to the first, second and third speed sensors $S_1$, $S_2$ and $S_3$ are collected in a bundle and connected to the electronic control unit U.

Figure 6:
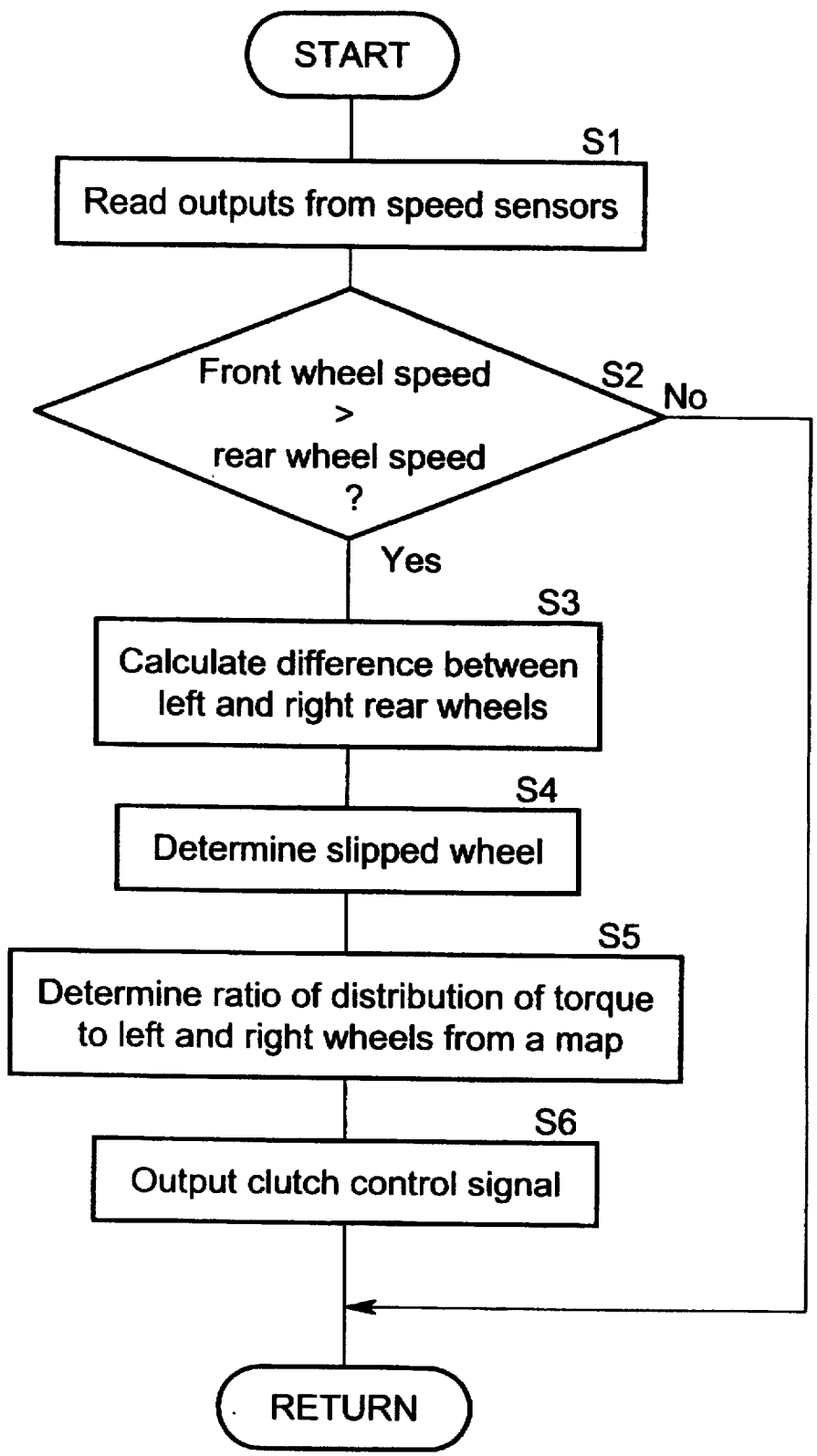
FIG. 6 is a flow chart for explaining the operation of the power transmitting system.

The operation of the embodiment of the present invention having the above-described arrangement will be described below with reference to a flow chart in FIG. 6.

First, at step $S_1$, outputs from the first, second and third speed sensors $S_1$, $S_2$ and $S_3$ are read. At step $S_2$, a front wheel speed $W_p$ calculated from the output from the first speed sensor $S_1$ is compared with a rear wheel speed $W_p'$ calculated from the outputs from the second and third speed sensors $S_1$ and $S_2$. The rear wheel speed $W_p'$ is calculated as an average value of the left rear wheel speed $W_L$ calculated from the output from the second speed sensor $S_2$ and the right rear wheel speed $W_R$ calculated from the output from the third speed sensor $S_3\{=(W_L+W_R)/2\}$.

If the front wheel speed $W_p$ does not exceed the rear wheel speed $W_p'$ at step S2, the left and right hydraulic clutches $C_L$ and $C_R$ are maintained in their non-engaged states, so that the vehicle is in a front wheel drive state. On the other hand, if the front wheel speed $W_p$ exceeds the rear wheel speed $W_p'$ at step S2 due to slipping of the front wheels $W_{LF}$ and $W_{RF}$, the left and right hydraulic clutches $C_L$ and $C_R$ are brought into their engaged states with a predetermined engagement force, thereby bringing the vehicle into its four-wheel drive state. If the vehicle V is turned, the radius of a locus of the front wheels $W_{LF}$ and $W_{RF}$, exceeds the radius of a locus of the front wheels $W_{LR}$ and $W_{RR}$ and hence, the front wheel speed $W_p$ becomes larger than the rear wheel speed $W_p'$ to generate a difference between the front and rear speeds, and the left and right hydraulic clutches $C_L$ and $C_R$ are brought into their engaged states with a predetermined engagement force to bring the vehicle into its four-wheel drive state.

In these cases, in order to determine the engagement force of left and right hydraulic clutches $C_L$ and $C_R$, a speed difference between the left rear wheel speed $W_L$ and the right rear wheel speed $W_R$ is calculated at step S3, and a slipped wheel is determined from the magnitude relationship between the left and right rear wheel speed $W_L$ and $W_R$ at step S4. Subsequently, at step S5, the magnitudes of a left rear wheel torque $T_L$ transmitted to the left rear wheel $W_{LR}$ and a right rear wheel torque $T_R$ transmitted to the right rear wheel $W_{RR}$ by the engagement of the left and right hydraulic clutches $C_L$ and $C_R$ are determined based on maps in FIGS. 7 and 8. At step S6, the electronic control unit U outputs a signal indicative of a command to control the engagement force of the left and right hydraulic clutches $C_L$ and $C_R$, so that such predetermined torque distribution is achieved.

If the left and right front wheels $W_{LF}$ and $W_{RF}$ to which the torque of the engine E is directly transmitted are slipped at the start of the vehicle V or during a sudden acceleration of the vehicle V, the torque is distributed to the rear wheels $W_{LR}$ and $W_{RR}$ in accordance with an increase in slip amount (i.e., an increase in difference $\Delta W_p$ between the front and rear wheel speeds), thereby an enhancement in starting performance and accelerating performance. If the left and right rear wheel speeds $W_L$ and $W_R$ are equal to each other at this time, the left rear wheel torque $T_L$ and the right rear wheel torque $T_R$ are equal to each other.

During turning of the vehicle, the magnitudes of the left rear wheel torque $T_L$ and the right rear wheel torque $T_R$ are controlled in accordance with the speed difference between the left and right rear wheels speeds $W_{LR}$ and $W_{RR}$.

Figure 7A:
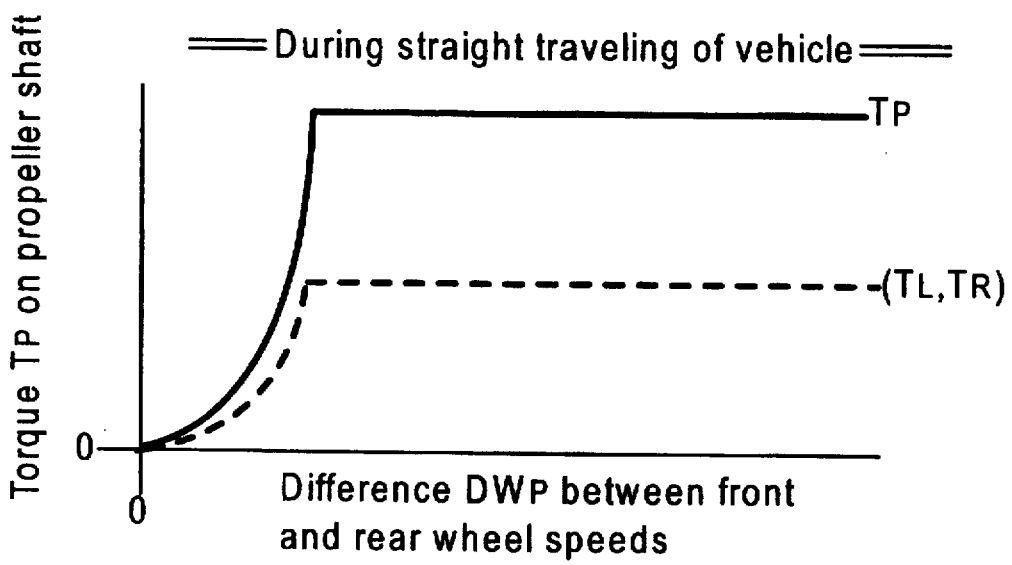
FIGS. 7A–7C are maps for determining a torque on a propeller shaft from a difference between front and rear wheel speeds.
Figure 7B:
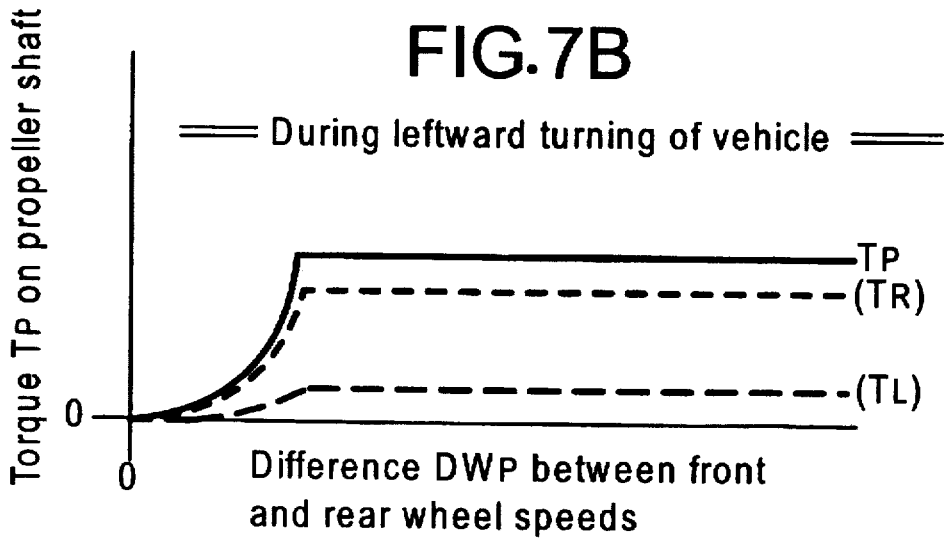
Figure 7C:
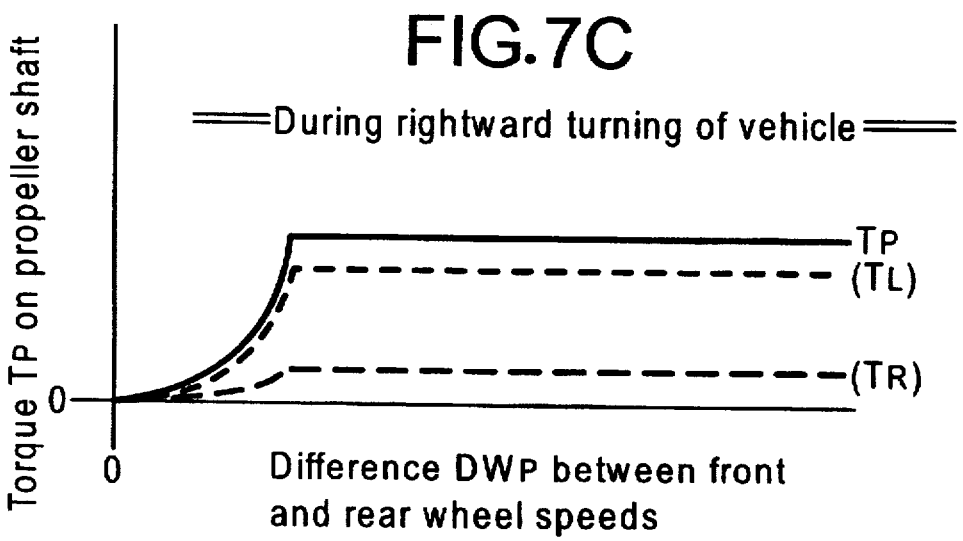
Figure 8:
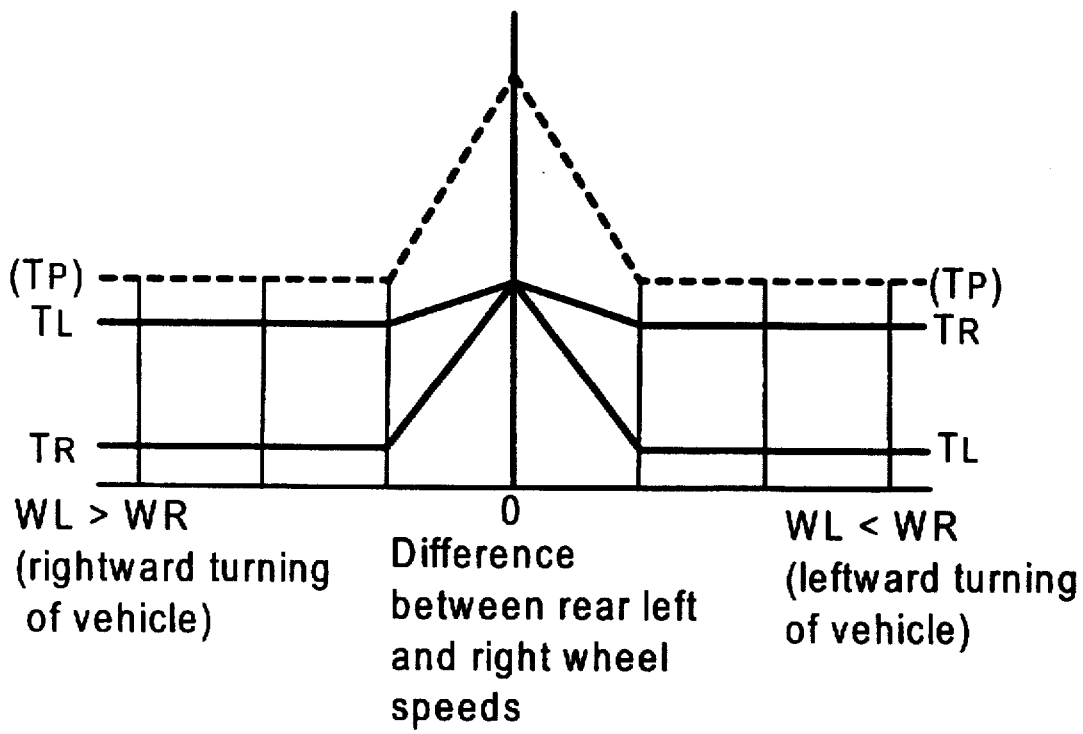
FIG. 8 is a map for determining a rear wheel torque from a difference between rear wheel speeds.

This will be described more specifically with reference to FIGS. 7 and 8. As shown in FIG. 7A, the torque $T_p$ on the propeller shaft is increased from 0 (zero), as the front and rear wheel speed difference $\Delta W_p$ ($\Delta W_p=W_p-W_p'$) is increased from 0 (zero). When the wheel speed difference $\Delta W_p$ is equal to or larger than a certain value, the torque $T_p$ is maintained at a given value. The torque $T_p$ on the propeller shaft is shared to a left rear wheel torque $T_L$ and a right rear wheel torque $T_R$ ($T_p=T_L+T_R$), but in a condition in which the left and right rear wheel speeds $W_L$ and $W_R$ are equal to each other, the left rear wheel torque $T_L$ and the right rear wheel torque $T_R$ are equal to each other($T_L=T_R$).

Here, consider that the vehicle is brought into a leftward turning state. When the vehicle is brought into the leftward turning state, the turning performance of the vehicle is enhanced by ensuring that the torque $T_R$ of the right rear wheel $W_{RR}$ which is an outer wheel during turning of the vehicle is larger than the torque $T_L$ of the left rear wheel $W_{LR}$ which is an inner wheel during turning of the vehicle. At this time, as apparent from FIGS. 8 and 7B., the torque $T_p$ on the propeller shaft, which is a sum total of the left rear wheel torque $T_L$ and the right rear wheel torque $T_R$, is decreased in accordance with an increase in speed difference between the left and right rear wheel speeds $W_{LR}$ and $W_{RR}$, and is maintained at the given value, when the speed difference between the left and right rear wheel speeds $W_{LR}$ and $W_{RR}$, is equal to or larger than a certain value. When the vehicle is brought into a rightward turning state, the turning performance of the vehicle is enhanced by ensuring that the torque $T_L$ of the left rear wheel $W_{LR}$ which is an outer wheel during turning of the vehicle is larger than the torque $T_R$ of the right rear wheel $W_{RR}$ which is an inner wheel during turning of the vehicle. Even during this rightward turning of the vehicle, as apparent from FIGS. 8 and 7C, the torque $T_p$ on the propeller shaft which is the sum total of the left rear wheel torque $T_L$ and the right rear wheel torque $T_R$ is decreased in accordance with the increase in speed difference between the left and right rear wheel speeds $W_{LR}$ and $W_{RR}$, and is maintained at the given value, when the speed difference between the left and right rear wheel speeds $W_{LR}$ and $W_{RR}$ is equal to or larger than the certain value.

If much torque is distributed to the rear wheels $W_{LR}$ and $W_{RR}$ in a state in which the radius of turning of the vehicle is small (i.e., in a state in which the speed difference between the left and right rear wheel speeds $W_{RL}$ and $W_{RR}$ is large), the travel resistance is increased to cause problems of a deterioration of specific fuel consumption, an abnormal sound produced in a drive system, an increase in load of the drive system and the like. However, by decreasing the torque distributed to the rear wheels $W_{LR}$ and $W_{RR}$ (i.e., the torque $T_p$ on the propeller shaft) in accordance with an increase in speed difference between the left and right rear wheel speeds $W_{LR}$ and $W_{RR}$ as shown by a dashed line in FIG. 8 as in the present embodiment, the increase in travel resistance is eliminated to achieve an enhancement in specific fuel consumption, a prevention of an abnormal sound generated in the drive system, and a reduction in weight provided by a decrease in load of the drive system.

Figure 9:
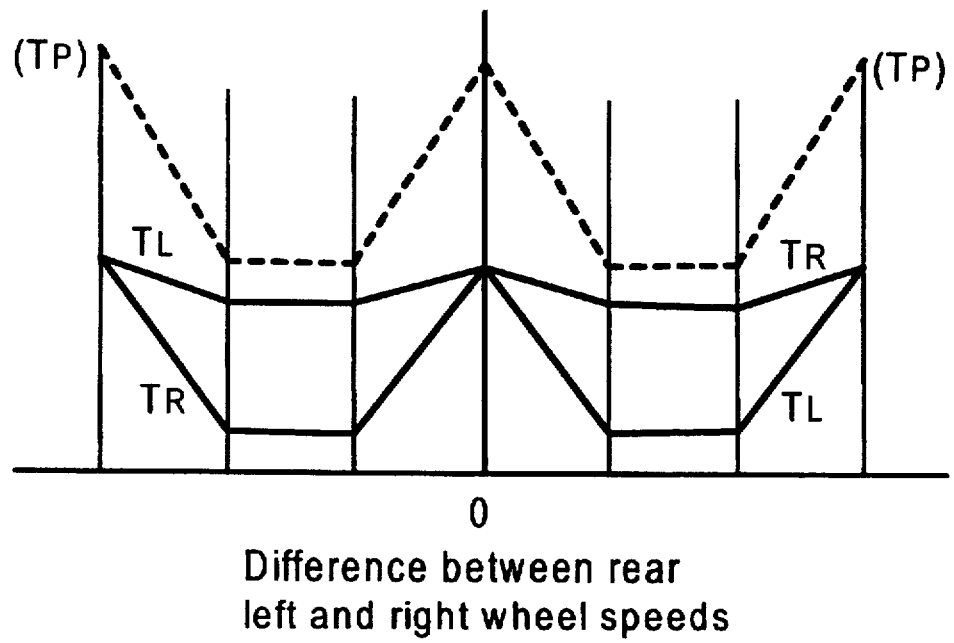
FIG. 9 is a map for determining a rear wheel torque from a difference between rear wheel speeds according to a second embodiment of the present invention.

A second embodiment of the present invention will now be described with reference to FIG. 9.

When the vehicle is traveling on a road having partially different friction coefficients or on a road having a severe unevenness, one of the left and right rear wheels $W_{LR}$ and $W_{RR}$ may be slipped to generate a large difference between the left and right wheel speeds in some cases, As a result, notwithstanding the fact that the vehicle is traveling straight, it is misjudged that the vehicle is being sharply turned, leading to a possibility that an unnecessary control, to decrease the torque $T_p$ on the propeller shaft, may be conducted. In the present embodiment, however, when a large difference between the left and right wheels speeds is detected, it is determined that one of the left and right rear wheels $W_{LR}$ and $W_{RR}$ has been slipped, and the torque to be distributed to the rear wheels $W_{LR}$ and $W_{RR}$ is increased again. Thus, it is possible to avoid the unnecessary torque decreasing control conducted during slipping of one of the rear wheels $W_{LR}$ and $W_{RR}$ to insure stability of the vehicle.

Although the embodiments of the present invention have been described in detail, it will be understood that the present invention is not limited to the above-described embodiments, and various modifications may be made without departing from the spirit and scope of the invention defined in claims.

For example, although the torque of the engine E is transmitted directly to the front wheels $W_{LF}$ and $W_{RF}$ and through the hydraulic clutches $C_L$ and $C_R$ to the rear wheels $W_{LR}$ and $W_{RR}$ in the embodiments, the present invention is also applicable to a vehicle in which the torque of the engine E is transmitted directly to the rear wheels $W_{LR}$ and $W_{RR}$ and through the hydraulic clutches $C_L$ and $C_R$ to the front wheels $W_{LF}$ and $W_{RF}$. The driving force varying means is limited to the hydraulic clutches $C_L$ and $C_R$ and may be another means such as electromagnetic clutches.

We claim:

1. A driving force control method in a 4-wheel drive vehicle in which the driving force of an engine is transmitted directly to a pair of main driving wheels and through driving force varying means to a pair of auxiliary driving wheels, said method comprising the steps of:

detecting a turning state of the vehicle based on a difference between left and right auxiliary driving wheel speeds;

decreasing the driving force to be transmitted to the auxiliary driving wheels, when the turning state is detected; and changing the driving force transmitted to the auxiliary driving wheels to a constant value, if it is determined that the difference between left and right auxiliary driving wheels speeds has reached a predetermined limit.

2. A driving force control method in a 4-wheel drive vehicle according to claim 1, wherein said main driving wheels are the front wheels and said auxiliary driving wheels are the rear wheels.

3. A driving force control method in a 4-wheel drive vehicle according to claim 1, wherein said main driving wheels are rear wheels and the auxiliary driving wheels are the front wheels.

4. A driving force control method in a 4-wheel drive vehicle in which the driving force of an engine is transmitted directly to a pair of main driving wheels and through driving force varying means to a pair of auxiliary driving wheels, said method comprising the steps of:

detecting a difference between left and right auxiliary driving wheel speeds;

distributing a driving force to the auxiliary driving wheel having a higher wheel speed in an amount larger than that distributed to the auxiliary driving wheel having a lower wheel speed; and decreasing the driving force transmitted to said auxiliary driving wheels in accordance with an increase in a wheel speed difference between said left and right auxiliary driving wheel speeds in a smaller range of said auxiliary driving wheel speed difference, while increasing the driving force distributed to said auxiliary driving wheels in accordance with an increase in the wheel speed difference in a larger range of said auxiliary driving wheel speed difference.

5. A driving force control method in a 4-wheel drive vehicle according to claim 4, wherein said main driving wheels are the front wheels and said auxiliary driving wheels are the rear wheels.

6. A driving force control method in a 4-wheel drive vehicle according to claim 4, wherein said main driving wheels are rear wheels and the auxiliary driving wheels are the front wheels.

* * * * *